(12) United States Patent
Ma et al.

(10) Patent No.: US 12,131,432 B2
(45) Date of Patent: *Oct. 29, 2024

(54) SYSTEM AND METHOD FOR PROVIDING A THREE-DIMENSIONAL OBJECT REPRESENTING A STORED-VALUE CARD FOR DISPLAY IN AUGMENTED REALITY

(71) Applicant: The Toronto-Dominion Bank, Toronto (CA)

(72) Inventors: Adrian Chung-Hey Ma, Richmond Hill (CA); Michael Pronski, Toronto (CA); Darius Braziunas, Toronto (CA); Imran Ahmed Khan, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,313

(22) Filed: Aug. 14, 2023

(65) Prior Publication Data

US 2023/0386156 A1 Nov. 30, 2023

Related U.S. Application Data

(63) Continuation of application No. 17/690,119, filed on Mar. 9, 2022, now Pat. No. 11,763,532.

(51) Int. Cl.
| | |
|---|---|
| G06T 19/00 | (2011.01) |
| G06Q 20/34 | (2012.01) |
| G06T 13/20 | (2011.01) |
| G06T 17/00 | (2006.01) |

(52) U.S. Cl.
CPC ......... *G06T 19/006* (2013.01); *G06Q 20/351* (2013.01); *G06T 13/20* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 8,797,353 | B2 | 8/2014 | Bregman-Amitai et al. |
| 9,092,774 | B2 | 7/2015 | Becorest et al. |
| 10,482,674 | B1 | 11/2019 | Wu et al. |
| 10,489,776 | B2 | 11/2019 | Isaacson et al. |
| 10,963,865 | B1 | 3/2021 | Rule et al. |
| 2014/0100994 | A1 | 4/2014 | Tatzel |
| 2018/0214767 | A1 | 8/2018 | Oh |
| 2019/0107990 | A1 | 4/2019 | Spivack et al. |
| 2020/0410758 | A1 | 12/2020 | Hamchuk |

*Primary Examiner* — Robert J Craddock
(74) *Attorney, Agent, or Firm* — Rowand LLP

(57) ABSTRACT

A computer server system comprises a communications module; a processor coupled with the communications module; and a memory coupled to the processor and storing processor-executable instructions which, when executed by the processor, configure the processor to receive, via the communications module and from a requesting device, a signal that includes a request to send a stored-value card to a recipient, the request identifying one or more parameters of the stored-value card; generate the stored-value card and a three-dimensional object representing the stored-value card according to the one or more parameters; and send, via the communications module and to a mobile device of the recipient, a signal that includes the three-dimensional object representing the stored-value card for display in augmented reality.

24 Claims, 15 Drawing Sheets

SYSTEM AND METHOD FOR PROVIDING A THREE-DIMENSIONAL OBJECT REPRESENTING A STORED-VALUE CARD FOR DISPLAY IN AUGMENTED REALITY

CROSS-REFERENCE TO RELATED APPLICATIONS

This application is a continuation of U.S. patent application Ser. No. 17/690,119, filed on Mar. 9, 2022, the entire content of which is incorporated herein by reference.

TECHNICAL FIELD

The present application relates to augmented reality and in particular systems and methods for providing a three-dimensional object representing a stored-value card for display in augmented reality.

BACKGROUND

Stored-value cards may be sent to a recipient in a digital format. The stored-value cards are often presented in two-dimensions and cannot be customized for the recipient.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
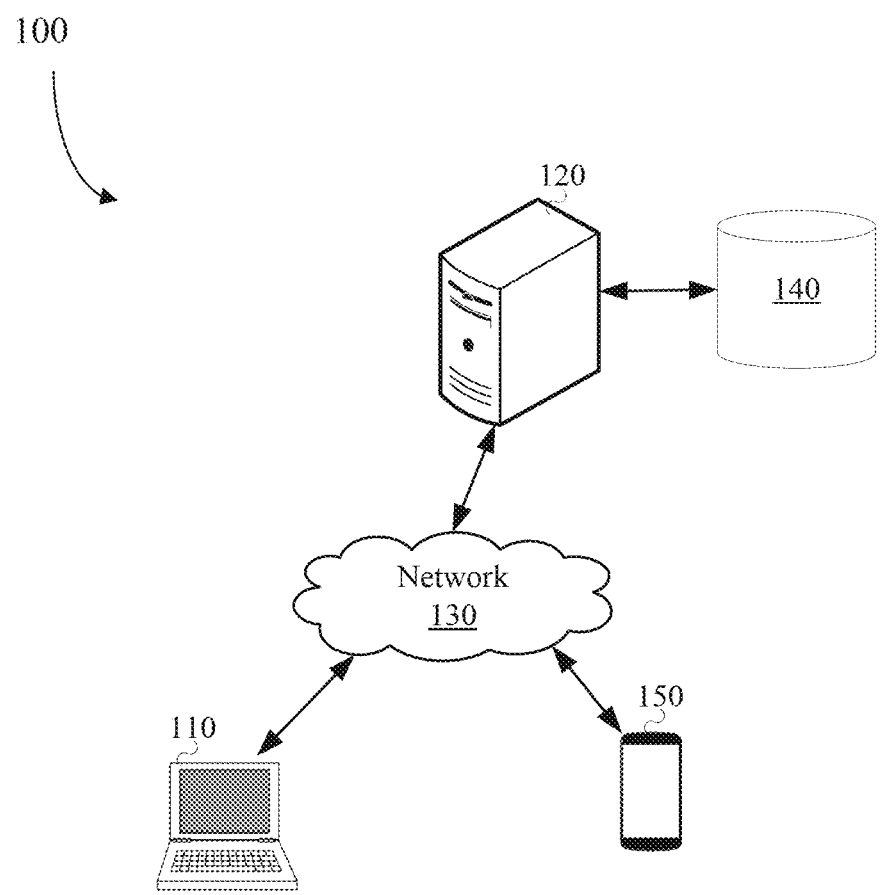
FIG. 1 is a schematic operation diagram illustrating an operating environment of an example embodiment.

Accordingly, in one aspect there is provided a computer server system comprising a communications module; a processor coupled with the communications module; and a memory coupled to the processor and storing processor-executable instructions which, when executed by the processor, configure the processor to receive, via the communications module and from a requesting device, a signal that includes a request to send a stored-value card to a recipient, the request identifying one or more parameters of the stored-value card; generate the stored-value card and a three-dimensional object representing the stored-value card according to the one or more parameters; and send, via the communications module and to a mobile device of the recipient, a signal that includes the three-dimensional object representing the stored-value card for display in augmented reality.

In one or more embodiments, the instructions, when executed by the processor, further configure the processor to send, via the communications module and to the mobile device of the recipient, a signal that causes the mobile device of the recipient to display a selectable option to view the stored-value card in the augmented reality; and receive, via the communications module and from the mobile device of the recipient, a signal indicating selection of the selectable option to view the stored-value card in the augmented reality.

In one or more embodiments, the three-dimensional object representing the stored-value card is rotatable within the augmented reality.

In one or more embodiments, the three-dimensional object representing the stored-value card includes one or more animation features that are activated in the augmented reality.

In one or more embodiments, the three-dimensional object representing the stored-value card is selectable within the augmented reality and, in response to selection of the three-dimensional object representing the stored-value card within the augmented reality, the stored-value card is stored in a mobile wallet of the mobile device of the recipient.

In one or more embodiments, the three-dimensional object representing the stored-value card includes a selectable interface element for storing the stored-value card in a mobile wallet of the mobile device of the recipient.

In one or more embodiments, within the mobile wallet, the stored-value card includes a selectable option to view the three-dimensional object representing the stored-value card in the augmented reality.

In one or more embodiments, the three-dimensional object representing the stored-value card is selectable within the augmented reality and, in response to selection of the three-dimensional object representing the stored-value card within the augmented reality, a machine-readable code is displayed on a display screen of the mobile device of the recipient.

In one or more embodiments, the three-dimensional object representing the stored-value card is placed in a fixed location within the augmented reality.

In one or more embodiments, the one or more parameters identify one or more graphical features to be displayed on a front side of the stored-value card and one or more graphical features to be displayed on a back side of the stored-value card.

In one or more embodiments, the one or more parameters include at least one of an amount of the stored-value card, a type of the stored-value card, a skin of the stored-value card, a style of the stored-value card, one or more images to be displayed on the stored-value card, one or more animation or display features to be used in the augmented reality, or a custom message to be displayed on the stored-value card.

According to another aspect there is provided a computer-implemented method comprising receiving, via a communications module and from a requesting device, a signal that includes request to send a stored-value card to a recipient, the request identifying one or more parameters of the stored-value card; generating the stored-value card and a three-dimensional object representing the stored-value card according to the one or more parameters; and sending, via the communications module and to a mobile device of the recipient, a signal that includes the three-dimensional object representing the stored-value card for display in augmented reality.

In one or more embodiments, the method further comprises sending, via the communications module and to the mobile device of the recipient, a signal that causes the mobile device of the recipient to display a selectable option to view the stored-value card in the augmented reality; and receiving, via the communications module and from the mobile device of the recipient, a signal indicating selection of the selectable option to view the stored-value card in the augmented reality.

In one or more embodiments, the three-dimensional object representing the stored-value card is rotatable within the augmented reality.

In one or more embodiments, the three-dimensional object representing the stored-value card includes one or more animation features that are activated in the augmented reality.

In one or more embodiments, the three-dimensional object representing the stored-value card is selectable within the augmented reality and, in response to selection of the three-dimensional object representing the stored-value card within the augmented reality, the stored-value card is stored in a mobile wallet of the mobile device of the recipient.

In one or more embodiments, the three-dimensional object representing the stored-value card includes a selectable interface element for storing the stored-value card in a mobile wallet of the mobile device of the recipient.

In one or more embodiments, within the mobile wallet, the stored-value card includes a selectable option to view the three-dimensional object representing the stored-value card in the augmented reality.

In one or more embodiments, the three-dimensional object representing the stored-value card is selectable within the augmented reality and, in response to selection of the three-dimensional object representing the stored-value card within the augmented reality, a machine-readable code is displayed on a display screen of the mobile device of the recipient.

According to another aspect there is provided a non-transitory computer readable storage medium comprising computer-executable instructions which, when executed, configure a processor to receive, via a communications module and from a requesting device, a signal that includes a request to send a stored-value card to a recipient, the request identifying one or more parameters of the stored-value card; generate the stored-value card and a three-dimensional object representing the stored-value card according to the one or more parameters; and send, via the communications module and to a mobile device of the recipient, a signal that includes the three-dimensional object representing the stored-value card for display in augmented reality.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

FIG. 1 is a schematic operation diagram illustrating an operating environment of an example embodiment. As shown, the system 100 includes a requesting device 110 and a server computer system 120 coupled to one another through a network 130, which may include a public network such as the Internet and/or a private network. The requesting device 110 and the server computer system 120 may be in geographically disparate locations. Put differently, the requesting device 110 and the server computer system 120 may be located remote from one another.

The requesting device 110 may be a computing device such as for example a laptop computer as shown in FIG. 1. However, the requesting device 110 may be a computing device of another type such as for example a smartphone, personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The server computer system 120 may be associated with a stored-value card provider such as for example a financial institution server and may maintain a database 140 that includes various data records. At least some of the data records may be associated with stored-value cards. For example, a data record may store stored-value card data such as for example a type of the stored-value card, a balance of the stored-value card, an identifier of the stored-value card, a recipient of the stored-value card, etc. The type of the stored-value card may identify a particular merchant or group of merchants for the stored-value card. For example, the stored-value card may only be used or redeemed at a particular merchant. The particular merchant may be associated with the server computer system 120 or may not be associated with the server computer system 120. Put another way, the server computer system 120 may be associated with a financial institution and the financial institution may offer a number of different types of stored-value cards, where each type of stored-value card may be associated with a particular merchant.

In one or more embodiments, the database 140 may additionally include data records that may be associated with customer bank accounts and/or customer credit card accounts. For example, a data record may reflect an amount of value stored in a customer's bank account. As another example, a data record may store transaction data associated with one or more transactions made on a credit card. At least some of the data records may include additional account data such as for example the name, age, address of the customer, etc. and the account data may be associated with the customer bank accounts and/or customer credit card accounts.

The system 100 additionally includes at least one mobile device 150 and the mobile device 150 may be associated with a recipient. The mobile device 150 may be, for example, a smartphone, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The mobile device 150 may be adapted to present augmented reality environments, a specialized form of virtual reality in which graphic objects in a virtual-reality environment are related to objects in a real-world scene or environment and are presented in real-time as the real-world environment is captured using an image capture module.

As will be described, the requesting device 110 may be adapted to send, to the server computer system 120, a signal that includes a request to send a stored-value card to a recipient. In response, the server computer system 120 may generate the stored-value card and a three-dimensional object representing the stored-value card and may send the three-dimensional object representing the stored-value card to the mobile device 150 of the recipient for display in augmented reality.

Figure 2:
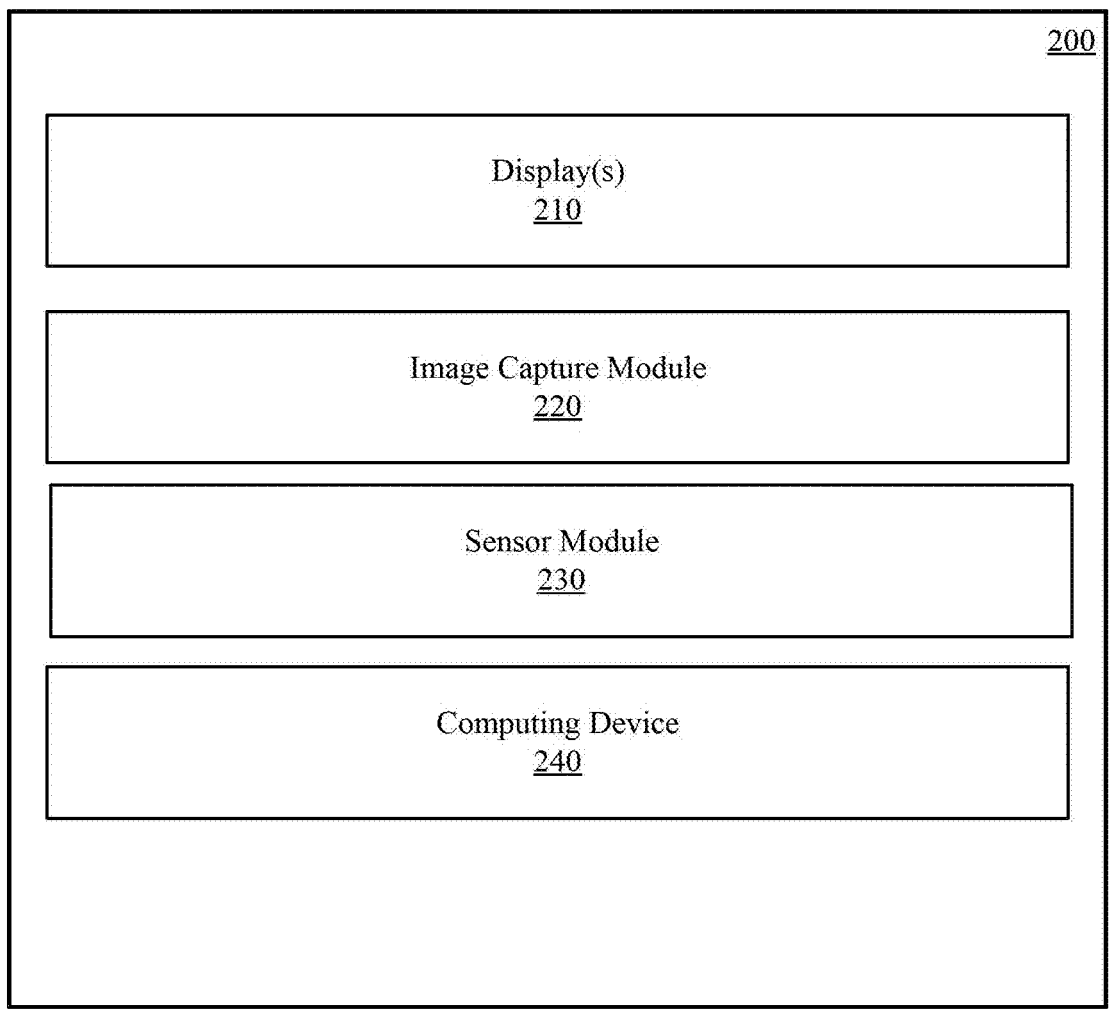
FIG. 2 is a simplified schematic diagram showing components of a computing device.

FIG. 2 is a simplified schematic diagram showing components of an exemplary computing device 200. The requesting device 110 and the mobile device 150 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
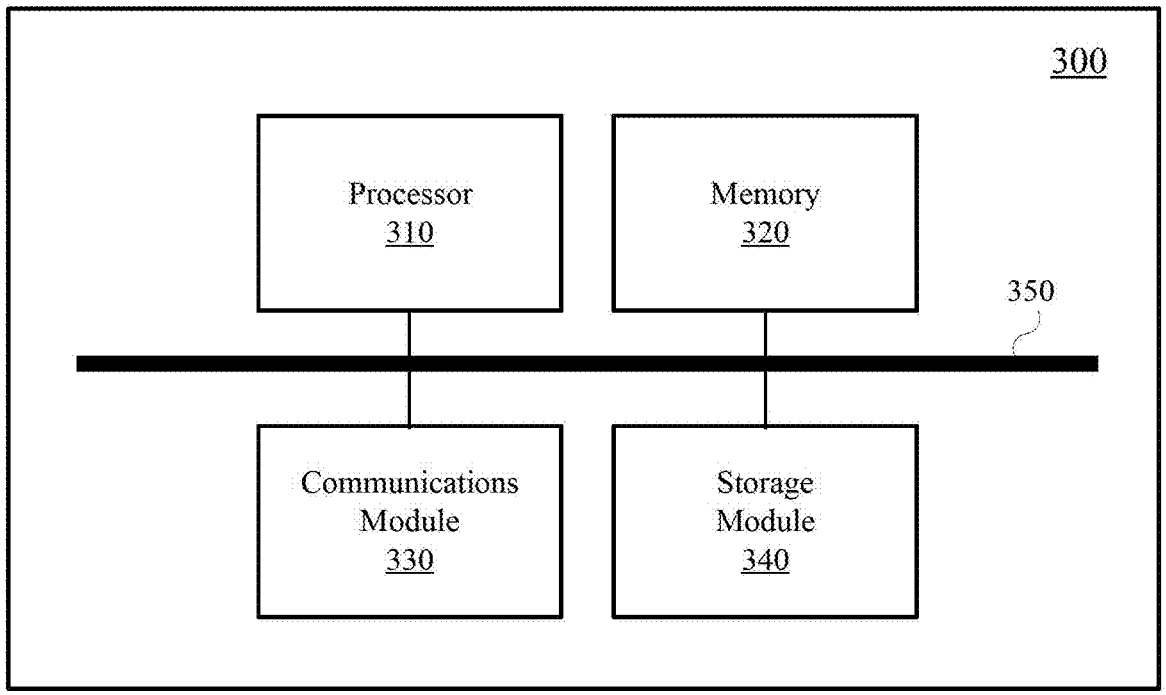
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and/or server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
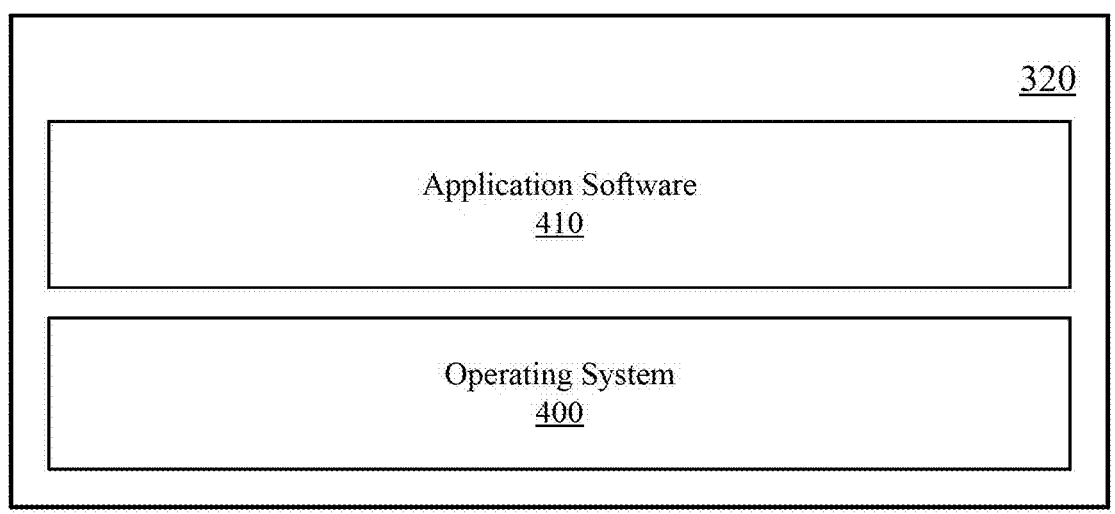
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the requesting device 110, the applications 410 may include a stored-value card management application that may be used to purchase, configure and/or send a stored-value card to a recipient. The stored-value card management application may be a web-based application or may be a mobile application. For example, the stored-value card management application may be accessed on the requesting device 110 via a web browser. As another example, the stored-value card management application may be downloaded onto the requesting device 110 and may be accessed thereon.

The stored-value management application may be accessed on the mobile device 150 and may adapt the mobile device 150 to present augmented reality environments, a specialized form of virtual reality in which graphic objects in a virtual-reality environment are related to objects in a real-world scene or environment and are presented in real-time as the real-world environment is captured using an image capture module. It will be appreciated that one or more other applications may adapt the mobile device 150 to present the augmented reality environments.

The stored-value card management application may require a requesting party to authenticate. For example, the stored-value card management application may be installed on the requesting device 110 and may require the user of the requesting device 110 (also referred to as the requesting party) to create an account. Account creation may require the submission of credentials to be used for authentication such as for example a username and a password. The username may include the requesting party's email address. It will be appreciated that in one or more embodiments the stored-value card management application may be accessed by the requesting device 110 via the internet and thus does not need to be downloaded or resident on the requesting device 110.

To access the stored-value card management application on the requesting device 110, the requesting party may be prompted to enter the credentials submitted during the account creation. For example, the requesting party may be prompted to submit a username and a password associated with their account. In response to receiving the credentials, the server computer system 120 may authenticate the requesting device 110 (or user) and may identify an account associated therewith.

Within the stored-value card management application, the requesting party may purchase a stored-value card and may define one or more parameters for the stored-value card. The one or more parameters may include at least one of an amount of the stored-value card, a type of the stored-value card, a skin of the stored-value card, a style of the stored-value card, one or more images to be displayed on the stored-value card, one or more animation or display features to be used in augmented reality, or a custom message to be displayed on the stored-value card.

In one or more embodiments, a graphical user interface may be displayed on a display screen of the requesting device 110 that may include one or more interface elements for purchasing the stored-value card and for defining the one or more parameters of the stored-value card. The one or more interface elements may include selectable interface elements and/or input fields that are to be completed by the requesting party.

As one example, the graphical user interface may include a number of selectable interface elements for defining the amount of the stored-value card where at least some of the selectable interface elements may be associated with a particular amount such as for example $5, $10, $25, $50, $100, etc. It will be appreciated that at least one interface element may include an input field that may be completed to define a custom amount for the stored-value card.

As another example, the graphical user interface may include a number of selectable interface elements for selecting the type of the stored-value card where at least some of the selectable interface elements may be associated with a particular type of the stored-value card such as for example a stored-value card that may only be used at a particular merchant, a stored-value card that may only be used at a particular group of merchants, a stored-value card that may be used at any merchant, etc.

As yet another example, the graphical user interface may include a number of selectable interface elements for selecting a skin of the stored-value card. The skin of the stored-value card may define the physical appearance of the stored-value card and the skin may be defined for a front of the stored-value card, a back of the stored-value card, or the front and the back of the stored-value card. It will be appreciated that the skin may be used as a background of the stored-value card and that one or more objects such as images or messages may be displayed overtop of the skin as defined by the requesting party. It will be appreciated that the skin of the stored-value card may be conditional on the type of the stored-value card. For example, the requesting party may select a stored-value card that may only be used at a particular merchant as such the skin of the stored-value card may be associated with the particular merchant. It will be appreciated that one or more types of stored-value cards may only have a single skin available and as such the requesting party may not have the opportunity to select a skin of the stored-value card.

As still yet another example, the graphical user interface may include a number of selectable interface elements for selecting a style of the stored-value card. The style of the stored-value card may include, for example, a specific colour of the stored-value card. For example, a particular skin may be selected and a particular colour may then be selected for that skin. The style of the stored-value card may include, for example, a particular layout for the stored-value card. The particular layout may include one or more elements of the stored-value card that are to be displayed on the stored-value card. For example, a first style may include an element that is defined on the stored-value card for displaying an image on a front-side of the stored-value card. As another example, a second style may include an element that is defined on the stored-value card for displaying an image on a front-side of the stored-value card and an element that is defined on the stored-value card for displaying a message on a back-side of the stored-value card. The different styles may include different combinations of elements that are to be displayed on the stored-value card.

As another example, the graphical user interface may include one or more selectable interface elements for uploading or submitting one or more images to be displayed on the stored-value card. For example, the requesting party may have selected the first style that is to display an image on the front-side of the stored-value card. In response to selection of the selectable interface element, the graphical user interface may be updated to include one or more selectable interface elements for uploading or submitting the image. The requesting party may select one of the selectable interface elements which may prompt the user to select a particular file or web address that includes the image. In this manner, one or more images may be submitted by the requesting party for display on the stored-value card.

As still yet another example, the graphical user interface may include one or more selectable interface elements for selecting one or more animation or display features to be used in augmented reality. For example, a selectable interface element may be for selecting a first animation feature that is to be used when displaying the stored-value card in augmented reality. The first animation feature may be, for example, an animation that makes it appear as though the stored-value card falls from the sky and lands at a position that is visible within an augmented reality view as viewed through the mobile device 150. Other animation features may include animation features used to grab the attention of the recipient such as for example having the stored-value card displayed such that it appears to be on fire, appears to be sparkling, etc.

As another example, the graphical user interface may include one or more interface elements for defining one or more custom messages to be displayed on the stored-value card. For example, the requesting party may have selected the second style that includes an element defined on the stored-value card for displaying a message on the back-side of the stored-value card. In response to selection of the interface element, the graphical user interface may be updated to include an interface element for entering the message and this may be done using, for example, an input device associated with the requesting device 110.

It will be appreciated that other parameters may be defined for the stored-value card that the other parameters may be defined by the requesting party within the stored-value card management application.

The stored-value card management application may additionally require that the requesting party provide identifying information of the recipient of the stored-value card such as for example an electronic address (mobile phone number, email address, etc.) associated with the recipient and this may be used to send the stored-value card to the recipient.

The stored-value card management application may additionally include a check-out page that includes one or more interface elements for providing payment information for purchasing the stored-value card.

Responsive to completion of the purchase of the stored-value card, the server computer system 120 may perform operations for providing the stored-value card to the recipient for display in augmented reality.

Figure 5:
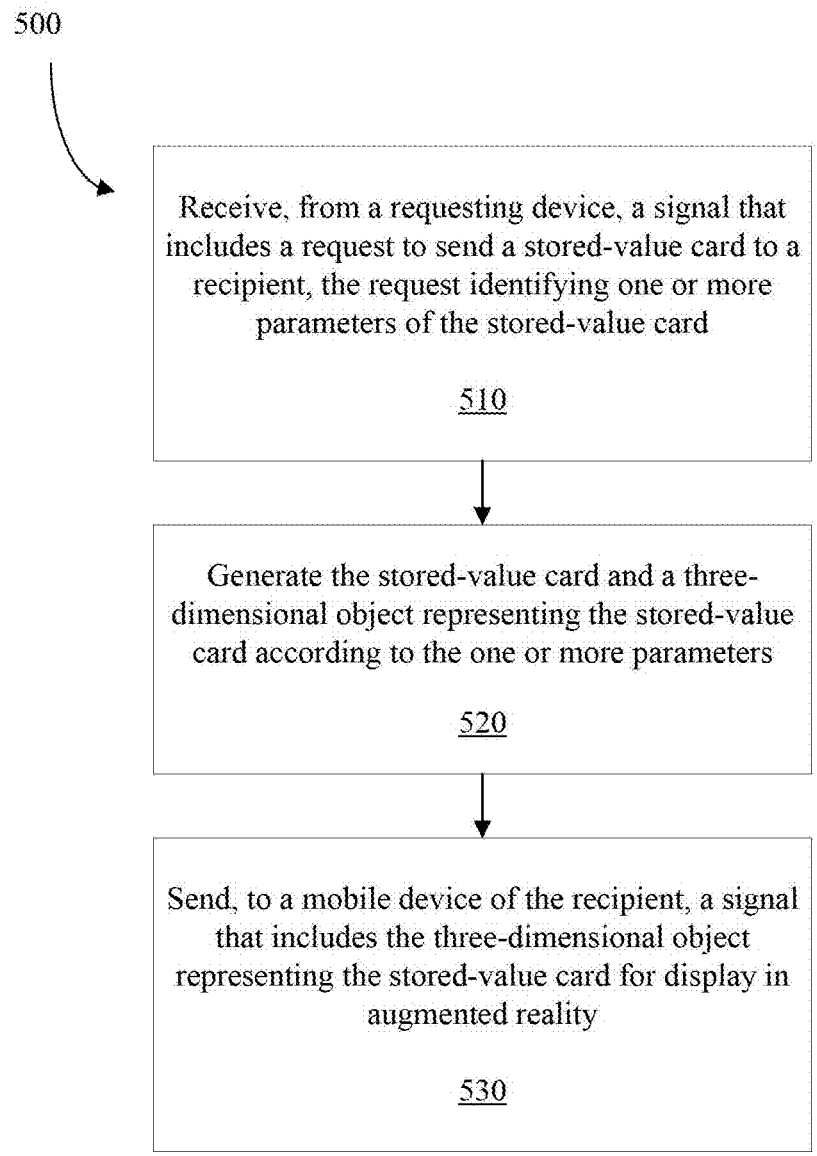
FIG. 5 is a flowchart showing operations performed by a server computer system in providing a three-dimensional object representing a stored-value card to a recipient for display in augmented reality according to an embodiment.

Reference is made to FIG. 5, which illustrates, in flow-chart form, a method 500 for providing a three-dimensional object representing a stored-value card to a recipient for display in augmented reality. The method 500 may be implemented by a computing device having suitable processor-executable instructions for causing the computing device to carry out the described operations. The method 500 may be implemented, in whole or in part, by the server computer system 120. It will be appreciated that one or more operations may be offloaded to the requesting device 110 and/or the mobile device 150.

The method 500 includes receiving, from a requesting device, a signal that includes a request to send a stored-value card to a recipient, the request identifying one or more parameters of the stored-value card (step 510).

In one or more embodiments the requesting device includes the requesting device 110. The one or more parameters may be defined by the requesting party within the stored-value card management application in manners described herein. The one or more parameters may include at least one of an amount of the stored-value card, a type of the stored-value card, a skin of the stored-value card, a style of the stored-value card, one or more images to be displayed on the stored-value card, one or more animation or display features to be used in augmented reality, or a custom message to be displayed on the stored-value card.

Responsive to the requesting party completing a purchase of the stored-value card, the requesting device 110 may send the signal that includes the request to send the stored-value card to the recipient to the server computer system 120. In one or more embodiments, the signal includes the one or more parameters and may additionally include identifying information of the recipient such as for example the electronic address (mobile phone number, email address, etc.) associated with the recipient.

The method 500 includes generating the stored-value card and a three-dimensional object representing the stored-value card according to the one or more parameters (step 520).

Responsive to receiving the signal that includes the request to send the stored-value card to the recipient, the server computer system 120 may generate the stored-value card and this may be done according to the one or more parameters.

In one or more embodiments, generating the stored-value card may include creating the stored-value card. For example, the server computer system may generate a unique identifier for the stored-value card.

In one or more embodiments, the unique identifier may be generated using a random number generator. For example, the server computer system 120 may send a signal requesting that a random sixteen (16) digit number be generated. The server computer system 120 may receive the random sixteen (16) digit number and this may be set as the unique identifier for the stored-value card.

In one or more embodiments, the unique identifier may follow a sequence of identifiers. For example, a unique identifier may end with one or more digits and the one or more digits may be incremented by a set amount, such as for example one (1) digit, each time a new unique number is to be generated for that particular type of stored-value card. For example, a unique number may end with 0001 and the next unique number may end with 0002.

In one or more embodiments, rather than creating the stored-value card, the server computer system 120 may obtain a unique number of the stored-value card. For example, the stored-value card may be a stored-value card that may only be used at a particular merchant and as such the particular merchant may be responsive to generate the unique number of the stored-value card. In this example, the server computer system 120 may engage, for example, an application programming interface (API) associated with the particular merchant to obtain the unique number of the stored-value card.

In one or more embodiments, the stored-value card may have been previously obtained by the server computer system 120. For example, a bulk purchase of stored-value cards may have been previously completed by a financial institution associated with the server computer system 120 and as such the database 140 may store data records that include a list of unique identifiers for the purchased stored-value cards. In this example, the server computer system 120 may assign a unique identifier of one of the purchased stored-value cards to the recipient and this may be based on, for example, the amount of the stored-value card. For example, the stored-value card to be sent to the recipient may be of the amount $50 and as such the server computer system 120 may select a particular previously-purchased stored-value card that is in the amount of $50 and may assign the unique identifier of the particular previously-purchased stored-value card to the recipient.

Responsive to generating the stored-value card, the server computer system 120 may send a signal causing the database 140 to store the unique identifier of the stored-value card and/or causing the database 140 to store the one or more parameters.

The server computer system 120 generates a three-dimensional object representing the stored-value card according to the one or more parameters.

In one or more embodiments, generating the three-dimensional object representing the stored-value card may include selecting a template three-dimensional object of a stored-value card. For example, the one or more parameters may identify a style of the stored-value card and the template three-dimensional object may be selected based on the style of the stored-value card.

Figure 6A:
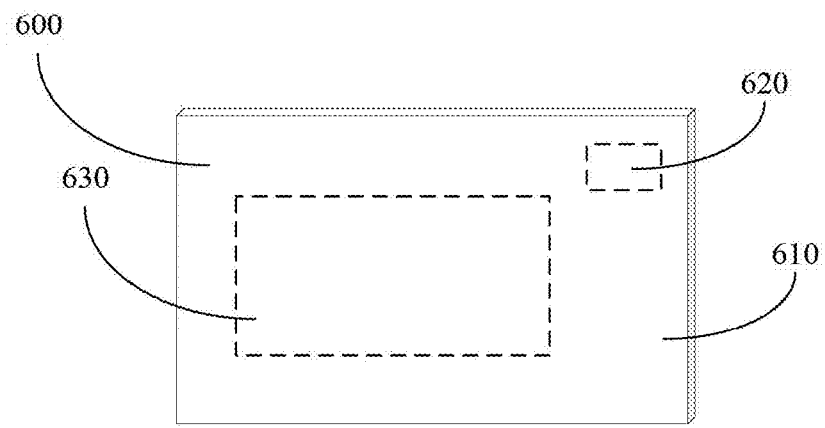
FIG. 6A shows a front side of an example template three-dimensional object representing a stored-value card according to an embodiment.
Figure 6B:
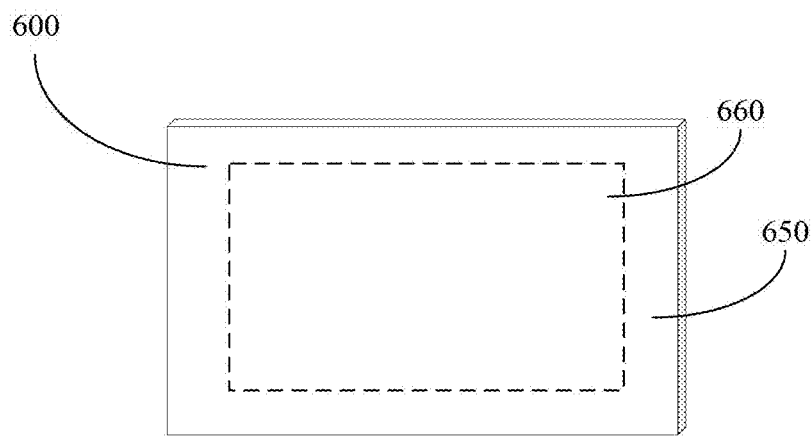
FIG. 6B shows a back side of an example template three-dimensional object representing a stored-value card according to an embodiment.

FIGS. 6A and 6B show an example template three-dimensional object 600 representing a stored-value card. Specifically, FIG. 6A shows a front side 610 of the example template three-dimensional object 600 representing the stored-value card. The front side 610 includes a first element 620 and a second element 630. In this example, the first element 620 may be used to display the amount of the stored-value card and the second element 630 may be used to display the type of the stored-value card.

FIG. 6B shows a back side 650 of the example template three-dimensional object 600 representing the stored-value card. The back side 650 includes a first element 660. The first element 660 may be used to display a custom message.

It will be appreciated that the various elements of the example template three-dimensional object 600 may be used to display one or more other features such as for example an image uploaded by the requesting party, an animation, etc. as identified by the one or more parameters.

It will be appreciated that other template three-dimensional objects may be used and each template three-dimensional object may include a unique or particular combination of elements and this may be defined by the requesting party such as for example by selecting a particular style of stored-value card.

Figure 7A:
FIG. 7A shows a front side of an example three-dimensional object representing a stored-value card according to an embodiment.
Figure 7B:
FIG. 7B shows a back side of an example three-dimensional object representing a stored-value card according to an embodiment.

The server computer system 120 may generate the three-dimensional object representing the stored-value card by populating the elements of the template three-dimensional object. FIGS. 7A and 7B show an example three-dimensional object 700 representing the stored-value card. It will be appreciated that the three-dimensional object 700 may be generated by the server computer system 120 by populating the various elements of the template three-dimensional object 600 (shown in FIGS. 6A and 6B).

FIG. 7A shows a front side 710 of the three-dimensional object 700. The front side 710 includes a first element 720 that displays the amount of the stored-value card which in this example is $100. The front side 710 includes a second element 730 that displays the type of the stored-value card which in this example is a stored-value card that may only be used at "Merchant A".

FIG. 7B shows a back side 750 of the three-dimensional object 700. The back side 750 includes a first element 760 that displays a custom message as submitted by the requesting party.

It will be appreciated that the three-dimensional object representing the stored-value card may be generated in a three-dimensional format that is compliant with or supported by one or more augmented reality tools. Example three-dimensional formats include DAR and OBJ/MTL formats. Example augmented reality tools include ARKit™, ARCore™, etc.

The method 500 includes sending, to a mobile device of the recipient, a signal that includes the three-dimensional object representing the stored-value card for display in augmented reality (step 530).

In one or more embodiments, the mobile device of the recipient includes the mobile device 150. The mobile device 150 may be identified via the identifying information of the recipient received during step 510 described herein. The identifying information includes, for example, the electronic address (mobile phone number, email address, etc.) associated with the recipient.

Figure 8:
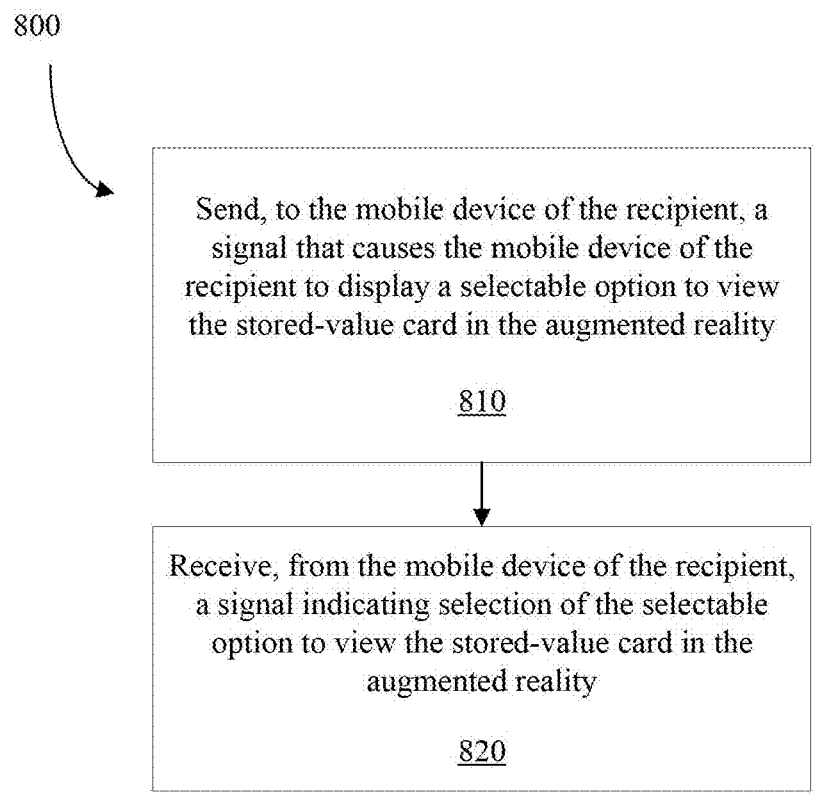
FIG. 8 is a flowchart showing operations performed by a server computer system in notifying a recipient of a stored-value card according to an embodiment.

In one or more embodiments, prior to sending the signal that includes the three-dimensional object representing the stored-value card for display in augmented reality, the server computer system 120 may notify the recipient of the stored-value card. Reference is made to FIG. 8, which illustrates, in flowchart form, a method 800 for notifying the recipient of the stored-value card. The method 800 may be implemented by a computing device having suitable processor-executable instructions for causing the computing device to carry out the described operations. The method 800 may be implemented, in whole or in part, by the server computer system 120. It will be appreciated that one or more operations may be offloaded to the requesting device 110 and/or the mobile device 150.

The method 800 includes sending, to the mobile device of the recipient, a signal that causes the mobile device of the recipient to display a selectable option to view the stored-value card in the augmented reality (step 810). The mobile device of the recipient may include the mobile device 150.

In one or more embodiments, the signal may cause the mobile device of the recipient to display a notification that includes the selectable option to view the stored-value card in the augmented reality. The notification may include a message that identifies the sender of the stored-value card, the value of the stored-value card, etc. The notification may be sent as a text message, email message, etc. or may be displayed as notification within, for example, a mobile application executing on the mobile device 150.

The user or recipient may select the selectable option by, for example, performing a tap gesture on a display screen of the mobile device 150 and in response the mobile device 150 may send a signal to the server computer system 120.

The method 800 includes receiving, from the mobile device of the recipient, a signal indicating selection of the selectable option to view the stored-value card in the augmented reality (step 820).

The server computer system 120 receives, from the mobile device 150 of the recipient, the signal indicating selection of the selectable option to view the stored-value card in the augmented reality. In response, the server computer system 120 may send the signal that includes the three-dimensional object representing the stored-value card for display in the augmented reality.

As mentioned, the mobile device 150 may be adapted to present augmented reality environments, a specialized form of virtual reality in which graphic objects in a virtual-reality environment are related to objects in a real-world scene or environment and are presented in real-time as the real-world environment is captured using an image capture module.

In one or more embodiments, the signal that includes the three-dimensional object representing the stored-value card for display in augmented reality may cause the mobile device 150 to perform one or more operations. For example, the signal may cause the mobile device 150 to perform operations to capture the real-world environment using the image capture module. As another example, the signal may cause the mobile device 150 to open a particular mobile application such as for example a stored-value card management application. As yet another example, the signal may cause the mobile device 150 to open a particular mobile application and to perform operations to capture the real-world environment using the image capture module. In one or more embodiments, the user or recipient may not have previously granted permission to the mobile application to access the image capture module and as such the mobile device 150 may display a notification that includes a selectable option for granting permission to the mobile application to access the image capture module. Responsive to the user or recipient selecting the selectable option, the mobile device 150 may perform operations to capture the real-world environment using the image capture module.

Figure 9:
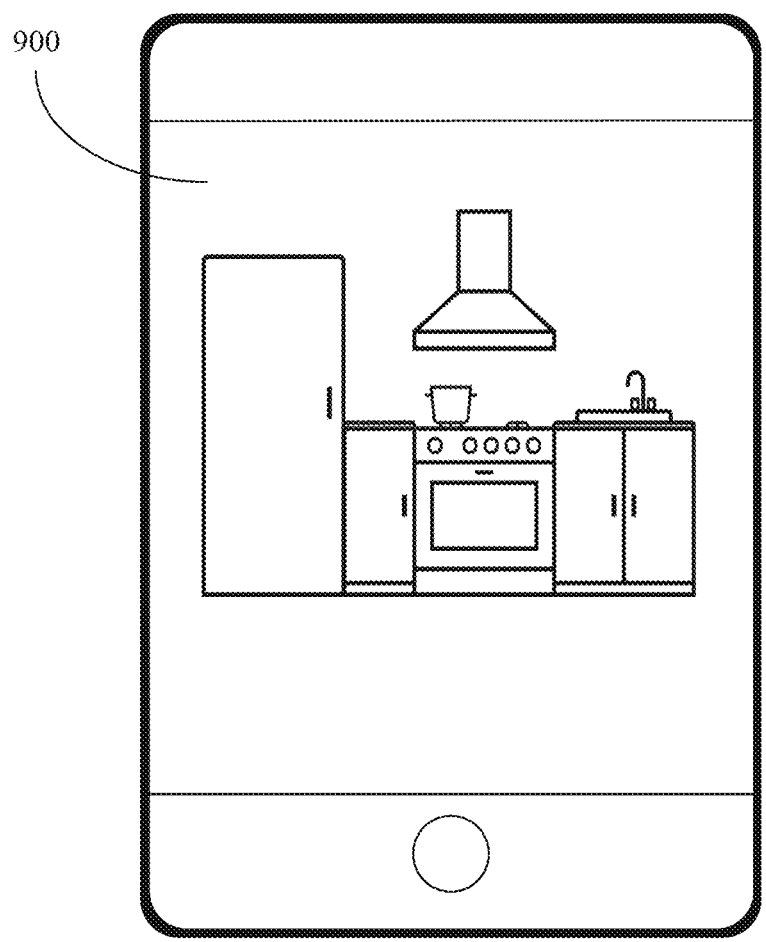
FIG. 9 is an example real-world environment captured using a mobile device and displayed on a display screen thereof according to an embodiment.

An example real-world environment 900 captured using the mobile device 150 and displayed on the display screen thereof is shown in FIG. 9. The real-world environment 900 is a live view of the environment seen by the image capture module of the mobile device 150. In the example shown in FIG. 9, the recipient and the mobile device 150 are located in a kitchen and as such the real-world environment 900 captured using the image capture module and displayed on the display screen includes a live view of the kitchen.

Figure 10:
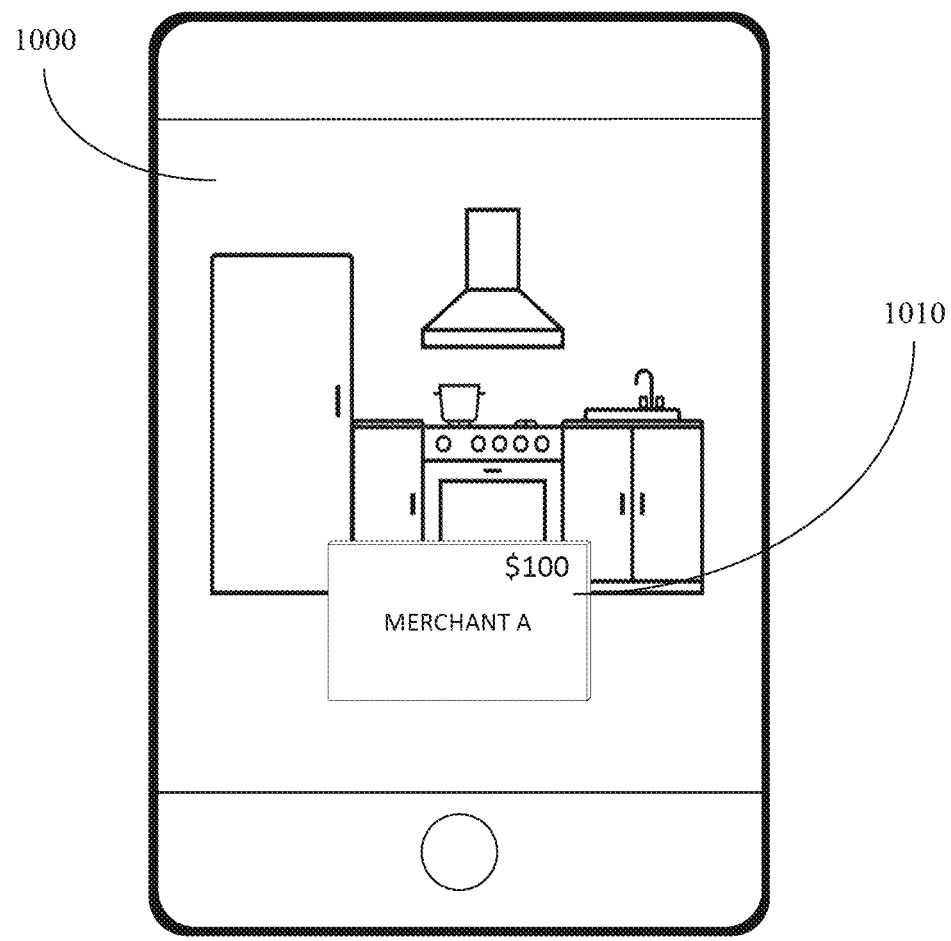
FIG. 10 is an example augmented reality displayed on a display screen of a mobile device according to an embodiment.

Responsive to receiving the signal that includes the three-dimensional object representing the stored-value card for display in the augmented reality, the mobile device 150 may display the three-dimensional object representing the stored-value card in the augmented reality. An example augmented reality 1000 displayed on the display screen of the mobile device 150 is shown in FIG. 10. As can be seen, the augmented reality 1000 includes the real-world environment 900 and a three-dimensional object 1010 representing the stored-value card.

In one or more embodiments, the three-dimensional object may include one or more animation features that are activated in the augmented reality. For example, the mobile device 150 and/or the server computer system 120 may activate an animation feature when placing the three-dimensional object in the augmented reality such that it appears as though the three-dimensional object falls from the sky and lands in front of the user or recipient. As another example, the three-dimensional object may appear to be on fire within the augmented reality. As another example, the three-dimensional object may twinkle within the augmented reality.

In one or more embodiments, the three-dimensional object representing the stored-value card may be placed in a fixed location within the augmented reality. For example, the three-dimensional object 1010 representing the stored-value card shown in FIG. 10 may be placed in a fixed location within the augmented reality. Put another way, the three-dimensional object 1010 may appear to be fixed in a location within the augmented reality such that movement of the mobile device 150 does not result in movement of the three-dimensional object 1010.

Figure 11:
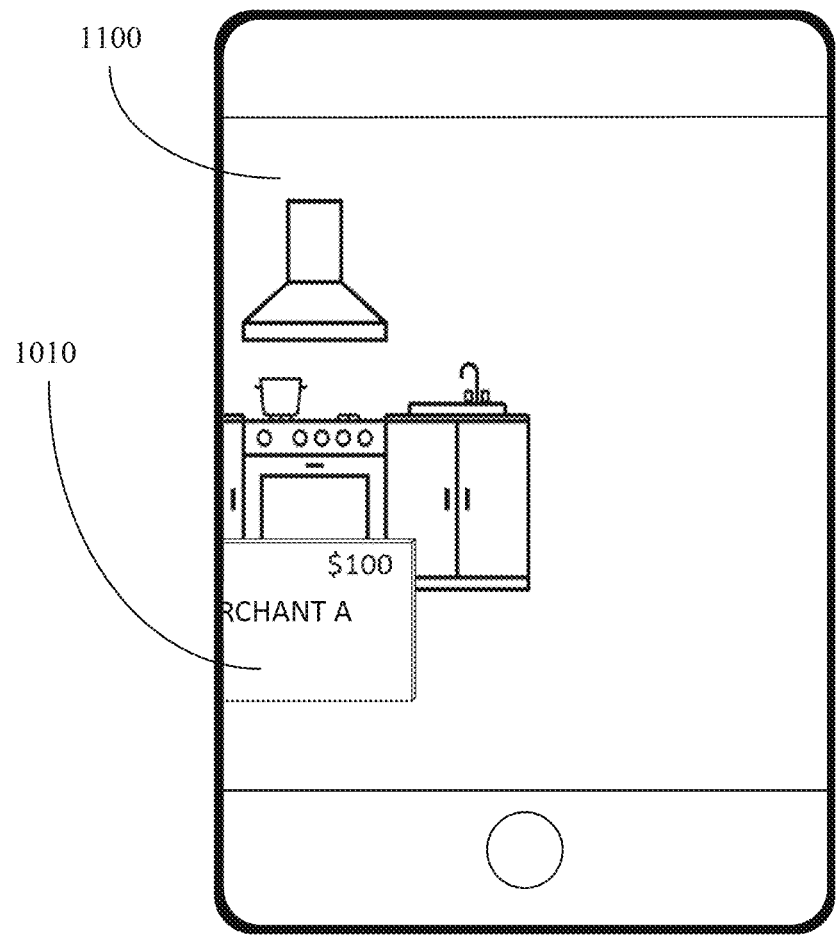
FIG. 11 is an example updated augmented reality displayed on a display screen of a mobile device according to an embodiment.

An example updated augmented reality 1100 displayed on the display screen of the mobile device 150 is shown in FIG. 11. The augmented reality 1100 is an updated view of the augmented reality 1000 shown in FIG. 10, where the mobile device 150 has been re-located within the real-world environment. As can be seen, the three-dimensional object 1010 is in a fixed location within the kitchen.

Figure 12:
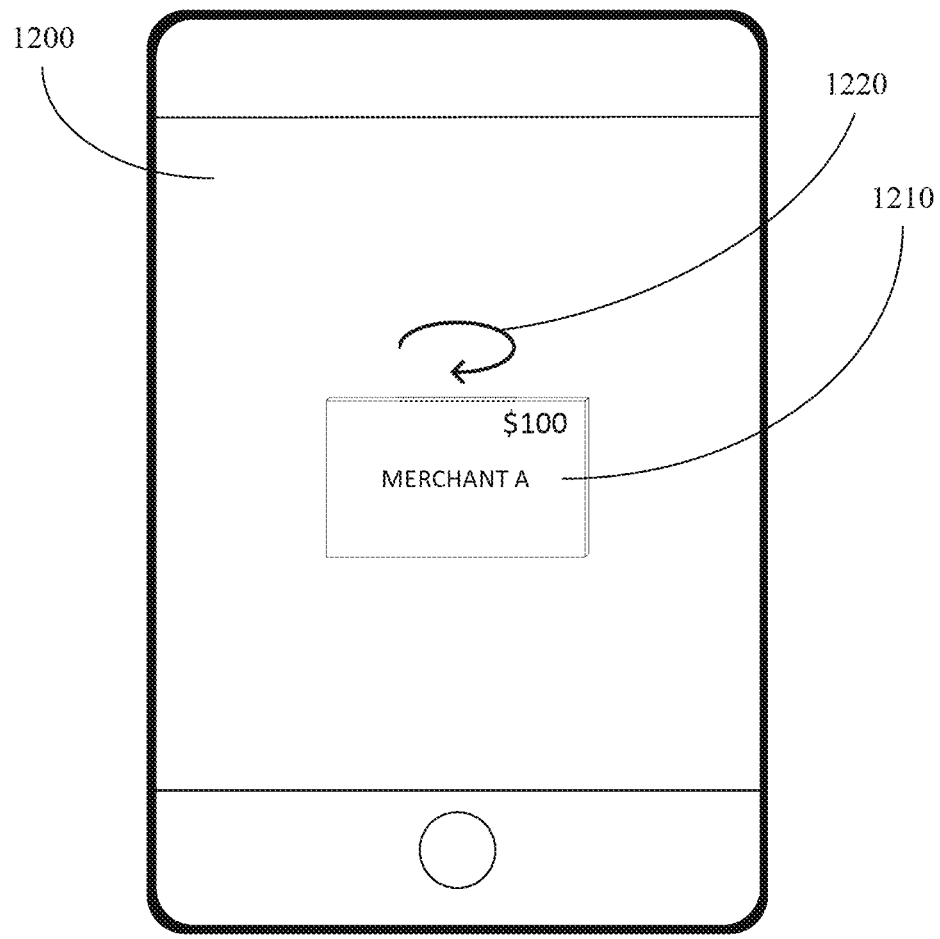
FIG. 12 is another example augmented reality displayed on a display screen of a mobile device according to an embodiment.

In one or more embodiments, the three-dimensional object is rotatable within the augmented reality. An example is shown in the augmented reality 1200 shown in FIG. 12. As can be seen, a three-dimensional object 1210 is displayed within the augmented reality 1200. An arrow 1220 is displayed above the three-dimensional object 1210 and indicates to the user or recipient that the three-dimensional object 1210 may be rotated within the augmented reality 1200. The user or recipient may perform a gesture, such as for example a swipe left or a swipe right gesture on the display screen of the mobile device 150, and in response the three-dimensional object 1210 may be rotated within the augmented reality 1200. In another example, rather than an arrow, another interface element may be displayed such as for example text. In another example, the arrow 1220 may not necessarily be visible within the augmented reality. Put another way, there may be no indication to the user or recipient that the three-dimensional object 1210 is rotatable within the augmented reality 1200.

Figure 13:
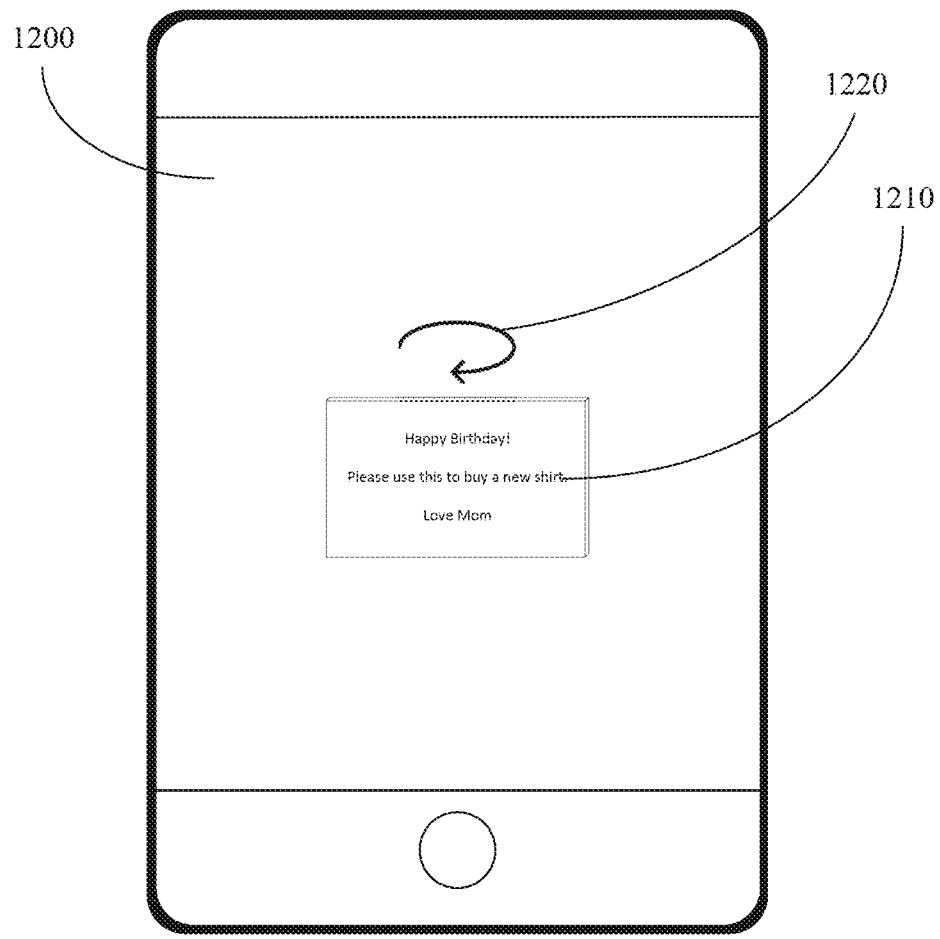
FIG. 13 is another example augmented reality displayed on a display screen of a mobile device according to an embodiment.

As mentioned, in response to the user or recipient performing a particular gesture, the three-dimensional object 1210 may be rotated. An example is shown in FIG. 13, where the three-dimensional object 1210 has been rotated such that the back side of the three-dimensional object 1210 is displayed. In this manner, the user or recipient is able to perform gestures to manipulate the three-dimensional object within the augmented reality and this allows the user or recipient to view both the front side and the back side of the three-dimensional object which may have been customized by the sender of the stored-value card.

In one or more embodiments, the three-dimensional object may be selectable within the augmented reality and in response to being selected, one or more actions may be triggered. For example, the user may perform a tap gesture on the display screen of the mobile device 150 at a location that corresponds to the location of the three-dimensional object within the augmented reality and in response, the stored-value card may be stored in a mobile wallet of the mobile device 150 of the recipient. The stored-value card may be stored in the mobile wallet in a two-dimensional format.

Figure 14:
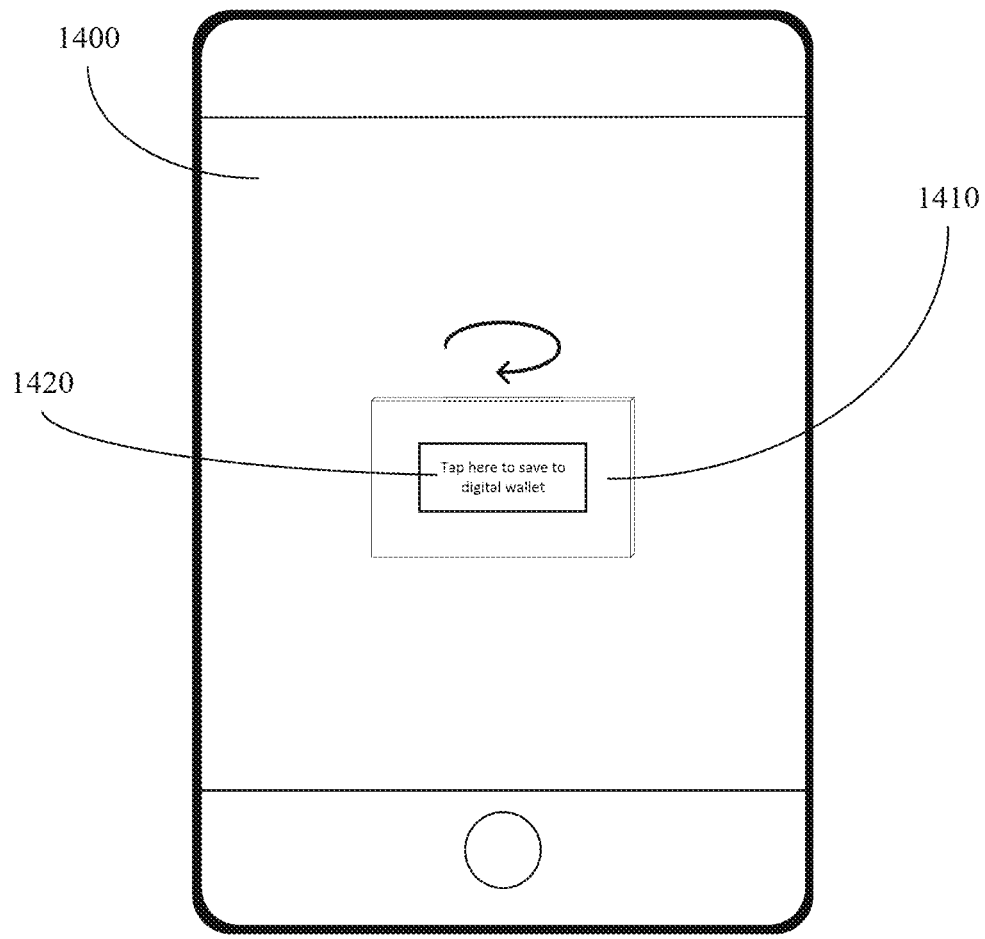
FIG. 14 is yet another example augmented reality displayed on a display screen of a mobile device according to an embodiment.

In one or more embodiments, the three-dimensional object representing the stored-value card may include a selectable interface element for storing the stored-value card in the mobile wallet of the mobile device 150 of the recipient. An example is shown in FIG. 14. As can be seen, augmented reality 1400 includes a three-dimensional object 1410 that is similar to the three-dimensional object 1210 described herein with the following exception. The three-dimensional object 1410 includes a selectable interface element 1420 that, when selected, causes the mobile device 150 and/or the server computer system 120 to perform operations to store the stored-value card in the mobile wallet.

In one or more embodiments, the selectable interface element 1420 may only be displayed in response to the user performing a gesture on the display screen of the mobile device 150. For example, the user or recipient may perform a tap gesture at a location on the display screen of the mobile device 150 at a location that corresponds to the back side of three-dimensional object 1210 (shown in FIG. 13) and in response the three-dimensional object 1210 may be updated to display the selectable interface element 1420 (shown in FIG. 14). In this manner, the user or recipient may view the back side of the three-dimensional object representing the stored-value card within the augmented reality and may perform a gesture that causes the augmented reality displayed on the display screen to be updated to include the selectable option to store the stored-value card in the mobile wallet.

In one or more embodiments, within the mobile wallet, the stored-value card may include a selectable option to view the three-dimensional object representing the stored-value card in the augmented reality. In response to selection of the selectable option to view the three-dimensional object representing the stored-value card in the augmented reality, the mobile device 150 and/or the server computer system 120 may perform operations to place the three-dimensional object in the fixed location within the augmented reality. For example, the three-dimensional object may be placed in the augmented reality in the kitchen (as shown in FIG. 10). In another example, the mobile device 150 and/or the server computer system 120 may perform operations to cause the mobile device 150 to display the three-dimensional object within the augmented reality at a location that corresponds to a current location or current environment of the mobile device 150.

Figure 15:
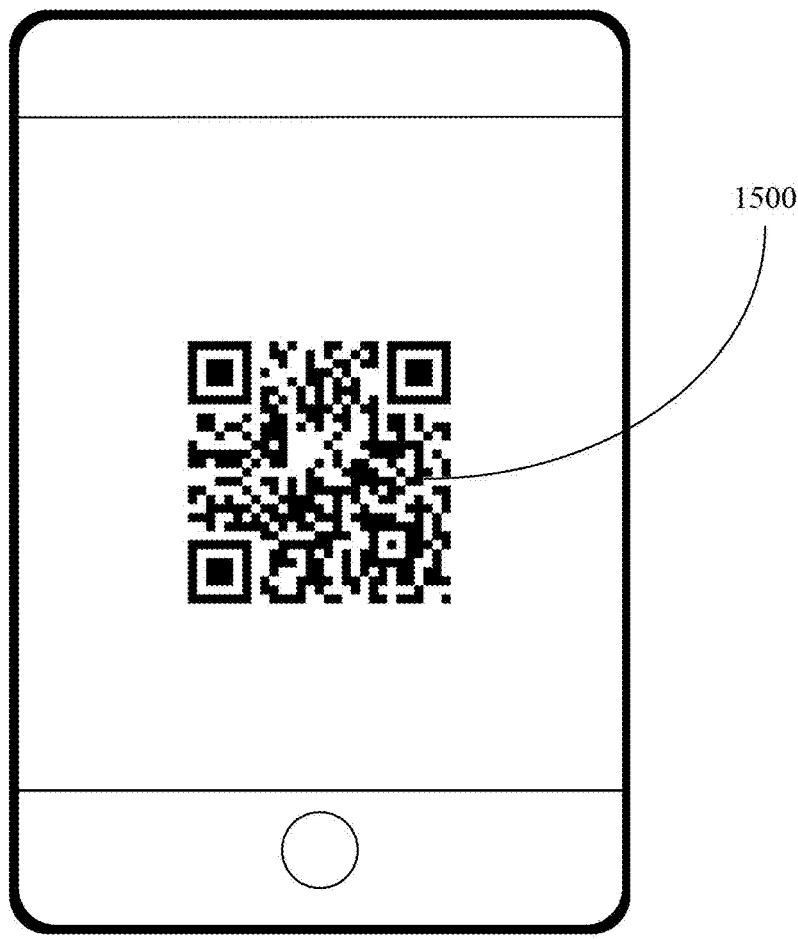
FIG. 15 is an example machine-readable code displayed on a display screen of a mobile device according to an embodiment.

In one or more embodiments, the action that may be triggered in response to selection of the three-dimensional object within the augmented reality may include displaying a machine-readable code. For example, the user may perform a tap gesture on the display screen of the mobile device 150 at a location that corresponds to the location of the three-dimensional object within the augmented reality and in response, a machine-readable code may be displayed on a display screen of the mobile device 150. An example machine-readable code 1500 is shown in FIG. 15. In this example, the machine-readable code 1500 may include a quick-response (QR) code that may be scanned or otherwise read by a scanning device. The machine-readable code 1500 may be used to redeem or use the stored-value card.

It will be appreciated that different gestures may be performed and each gesture may trigger a particular action. Example gestures include a tap gesture, a double tap gesture, a swipe gesture, a zoom-in gesture, a zoom-out gesture, etc. Example actions that may be triggered include storing the stored-value card in the mobile wallet, rotating the three-dimensional object within the augmented reality, relocating the three-dimensional object within the augmented reality, increasing a size of the three-dimensional object within the augmented reality, decreasing a size of the three-dimensional object within the augmented reality, activating one or more animation features of the three-dimensional object, changing a colour of the three-dimensional object, etc.

An example method that may be performed in response to different gestures may include receiving a signal indicating a first gesture being performed on a display screen of the mobile device, updating the three-dimensional object representing the stored-value card in the augmented reality to include a selectable element, receiving a signal indicating a second gesture being performed on a display screen of the mobile device, and in response to receiving the second gesture, storing a two-dimensional representation of the stored-value card in a mobile wallet of the mobile device. The two-dimensional representation of the stored-value card may include a selectable element for viewing or displaying the three-dimensional object representing the stored-value card in the augmented reality and/or may include a selectable element for viewing or displaying the machine-readable code, where the machine-readable code may be scanned by a scanning device to spend or otherwise use the stored-value card.

Figure 16:
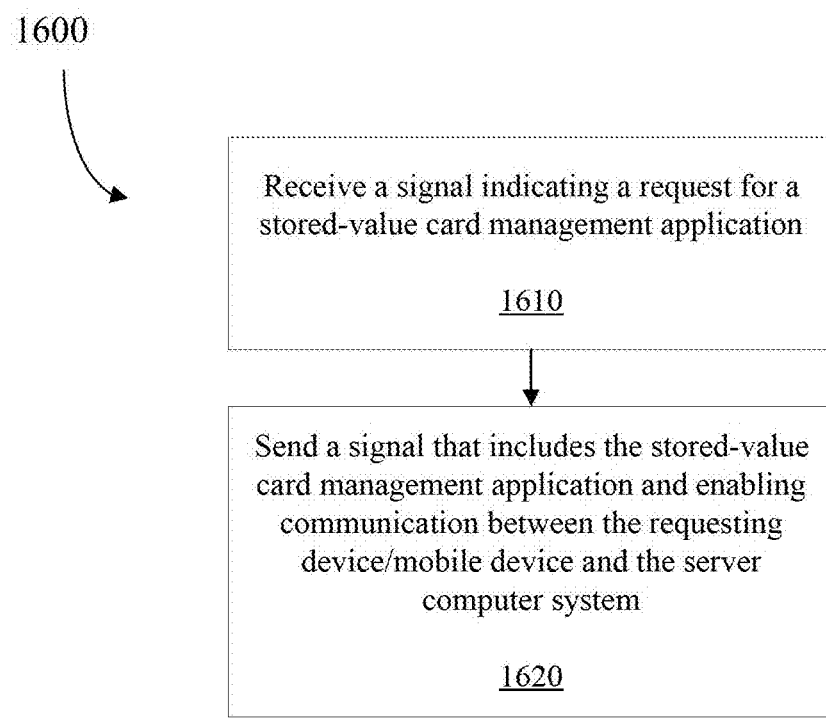
FIG. 16 is a flowchart showing operations performed by a server computer system in providing a stored-value card management application according to an embodiment.

As mentioned, the server computer system 120 may provide a stored-value card management application to the requesting device 110 and/or the mobile device 150. FIG. 16 is a flowchart showing operations performed by the server computer system 120 in providing the stored-value card management application to the requesting device 110 and/or the mobile device 150 according to an embodiment. The operations may be included in a method 1600 which may be performed by the server computer system 120. For example, computer-executable instructions stored in memory of the server computer system 120 may, when executed by one or more processors, configure the server computer system 120 to perform the method 1600 or a portion thereof.

The method 1600 includes receiving, from the requesting device 110 and/or the mobile device 150, a signal indicating a request for the stored-value card management application (step 1610).

In one or more embodiments, the user or recipient may visit a mobile application store on the requesting device 110 and/or the mobile device 150 and may select a selectable option to download the stored-value card management application. In response to the user selecting the selectable option, the requesting device 110 and/or the mobile device 150 may send a signal to the server computer system 120 indicating a request for the stored-value card management application.

The method 1600 includes sending, to the requesting device 110 and/or the mobile device 150, a signal that includes the stored-value card management application and enabling communication between the requesting device 110 and/or the mobile device 150 and the server computer system 120 (step 1620). The requesting device 110 and/or the mobile device 150 store the stored-value card management application in memory. The stored-value card management application may remain in memory of the requesting device 110 and/or the mobile device 150 until it is uninstalled or removed by the user or recipient. The stored-value card management application allows or enables communication between the requesting device 110 and/or the mobile device 150 and the server computer system 120.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A computer server system comprising:
a communications module;
a processor coupled with the communications module; and
a memory coupled to the processor and storing processor-executable instructions which, when executed by the processor, configure the processor to:
generate a three-dimensional object representing a stored-value card; and
send, via the communications module, a signal that includes the three-dimensional object representing the stored-value card for display in augmented reality, the three-dimensional object representing the stored-value card selectable within the augmented reality via a first gesture to perform a first action associated with the stored-value card and selectable within the augmented reality via a second gesture to perform a second action associated with the stored-value card.

2. The computer server system of claim 1, wherein the first action or the second action includes displaying a machine-readable code on a display screen of a mobile device.

3. The computer server system of claim 1, wherein the first action or the second action includes storing the stored-value card in a mobile wallet resident on a mobile device.

4. The computer server system of claim 3, wherein within the mobile wallet, the stored-value card includes a selectable option to view the three-dimensional object representing the stored-value card in the augmented reality.

5. The computer server system of claim 1, wherein the first action or the second action includes updating the three-dimensional object representing the stored-value card to display a selectable interface element for storing the stored-value card in a mobile wallet resident on a mobile device.

6. The computer server system of claim 1, wherein the instructions, when executed by the processor, further configure the processor to:
receive, via the communications module and from a mobile device, a signal indicating selection of the three-dimensional object representing the stored-value card via the first gesture; and
in response to receiving the signal indicating selection of the three-dimensional object representing the stored-value card via the first gesture, performing the first action associated with the stored-value card.

7. The computer server system of claim 1, wherein the three dimensional object representing the stored value card is selectable within the augmented reality by performing the first gesture or the second gesture includes a tap gesture performed on a display screen of a mobile device at a location that corresponds to the location of the three-dimensional object within the augmented reality.

8. The computer server system of claim 1, wherein the three-dimensional object representing the stored-value card is rotatable within the augmented reality.

9. The computer server system of claim 8, wherein the first gesture or the second gesture includes a swipe gesture and the three-dimensional object representing the stored-value card is rotatable within the augmented reality by performing the swipe gesture on the display screen of a mobile device.

10. The computer server system of claim 1, wherein the instructions, when executed by the processor, further configure the processor to:
receive, via the communications module and from a requesting device, a signal that includes a request to send a stored value card to a recipient, the request identifying one or more parameters of the stored value card; and
generate the stored value card according to the one or more parameters.

11. The computer server system of claim 10, wherein the one or more parameters include at least one of an amount of the stored-value card, a type of the stored-value card, a skin of the stored-value card, a style of the stored-value card, one or more images to be displayed on the stored-value card, one or more animation or display features to be used in the augmented reality, or a custom message to be displayed on the stored-value card.

12. The computer server system of claim 1, wherein the three-dimensional object representing the stored-value card is placed in a fixed location within the augmented reality.

13. A computer-implemented method comprising:
generating a three-dimensional object representing a stored-value card; and
sending, via a communications module, a signal that includes the three-dimensional object representing the stored-value card for display in augmented reality, the three-dimensional object representing the stored-value card selectable within the augmented reality via a first gesture to perform a first action associated with the stored-value card and selectable within the augmented reality via a second gesture to perform a second action associated with the stored-value card.

14. The computer-implemented method of claim 13, wherein the first action or the second action includes displaying a machine-readable code on a display screen of a mobile device.

15. The computer-implemented method of claim 13, wherein the first action or the second action includes storing the stored-value card in a mobile wallet resident on a mobile device.

16. The computer-implemented method of claim 15, wherein within the mobile wallet, the stored-value card includes a selectable option to view the three-dimensional object representing the stored-value card in the augmented reality.

17. The computer-implemented method of claim 13, wherein the first action or the second action includes updating the three-dimensional object representing the stored-value card to display a selectable interface element for storing the stored-value card in a mobile wallet resident on a mobile device.

18. The computer-implemented method of claim 13, further comprising:
receiving, from a mobile device, a signal indicating selection of the three-dimensional object representing the stored-value card via the first gesture; and
in response to receiving the signal indicating selection of the three-dimensional object representing the stored-value card via the first gesture, performing the first action associated with the stored-value card.

19. The computer-implemented method of claim 13, wherein the three-dimensional object representing the stored value card is selectable within the augmented reality by performing the first gesture or the second gesture includes a tap gesture performed on a display screen of a mobile device at a location that corresponds to the location of the three-dimensional object within the augmented reality.

20. The computer-implemented method of claim 19, wherein the first gesture or the second gesture includes a swipe gesture and the three-dimensional object representing the stored-value card is rotatable within the augmented reality by performing the swipe gesture on a display screen of a mobile device.

21. The computer-implemented method of claim 13, further comprising:
receiving, from a requesting device, a signal that includes a request to send a stored value card to a recipient, the request identifying one or more parameters of the stored value card; and
generating the stored value card according to the one or more parameters.

22. The computer-implemented method of claim 21, wherein the one or more parameters include at least one of an amount of the stored-value card, a type of the stored-value card, a skin of the stored-value card, a style of the stored-value card, one or more images to be displayed on the stored-value card, one or more animation or display features to be used in the augmented reality, or a custom message to be displayed on the stored-value card.

23. The computer-implemented method of claim 13, wherein the three-dimensional object representing the stored-value card is placed in a fixed location within the augmented reality.

24. A non-transitory computer-readable storage medium comprising processor-executable instructions which, when executed, configure at least one processor to:
generate a three-dimensional object representing a stored-value card; and
send, via a communications module, a signal that includes the three-dimensional object representing the stored-value card for display in augmented reality, the three-dimensional object representing the stored-value card selectable within the augmented reality via a first gesture to perform a first action associated with the stored-value card and selectable within the augmented reality via a second gesture to perform a second action associated with the stored-value card.

\* \* \* \* \*